US012610108B2

(12) United States Patent
Wang et al.

(10) Patent No.: US 12,610,108 B2
(45) Date of Patent: Apr. 21, 2026

(54) SYSTEM AND METHOD FOR CONTENT RECOMMENDATION VIA SEQUENCE AWARE USER ENCODER

(71) Applicant: YAHOO ASSETS LLC, New York, NY (US)

(72) Inventors: Pei-Xun Wang, Taipei City (TW); Yu-Ting Chang, Taipei City (TW); Wei-Da Chen, Kaohsiung City (TW); Man-Hsin Kao, New Taipei City (TW); Tzu-Chiang Liou, New Taipei City (TW); Kuan Yu Chen, New Taipei City (TW)

(73) Assignee: YAHOO ASSETS LLC, Dulles (VA)

( * ) Notice: Subject to any disclaimer, the term of this patent is extended or adjusted under 35 U.S.C. 154(b) by 109 days.

(21) Appl. No.: 18/428,832

(22) Filed: Jan. 31, 2024

(65) Prior Publication Data

US 2025/0247582 A1      Jul. 31, 2025

(51) Int. Cl.
*H04N 21/466*          (2011.01)

(52) U.S. Cl.
CPC ............................... *H04N 21/4668* (2013.01)

(58) Field of Classification Search
CPC ........... H04N 21/4668; H04N 21/4532; H04N 21/251; H04N 21/4666; H04N 21/25891; H04N 21/44218; H04N 21/44204; H04N 21/466
USPC .......................................................... 725/46
See application file for complete search history.

(56) References Cited

U.S. PATENT DOCUMENTS

| | | | | |
|---|---|---|---|---|
| 2012/0327119 A1* | 12/2012 | Woo | ........................ | G06F 3/147 |
| | | | | 345/633 |
| 2014/0179441 A1* | 6/2014 | Morrison, III | ............ | A63F 9/24 |
| | | | | 463/43 |
| 2017/0004402 A1* | 1/2017 | Graham | .............. | G06F 16/9535 |
| 2020/0137450 A1* | 4/2020 | Mishra | ............. | H04N 21/44218 |
| 2023/0252269 A1* | 8/2023 | Zhai | ........................ | G06N 3/08 |
| | | | | 706/12 |
| 2024/0177214 A1* | 5/2024 | Ahn | ................... | G06Q 30/0631 |
| 2024/0403623 A1* | 12/2024 | Mohamed Halim | .. | G06N 3/047 |
| 2024/0412271 A1* | 12/2024 | Xiao | .................. | G06Q 30/0631 |
| 2025/0127451 A1* | 4/2025 | Sakemi | .................. | A61B 5/364 |
| 2025/0234069 A1* | 7/2025 | Bhattacharya | ......... | G06N 20/00 |

* cited by examiner

*Primary Examiner* — Cynthia M Fogg
(74) *Attorney, Agent, or Firm* — Venable LLP

(57)          ABSTRACT

The present teaching relates to content recommendation. Content is selected from multiple pieces of content for recommending to a user based on a user embedding and contextual information. Performance of the user with respect to the recommended content is obtained. The user embedding for the user is adapted based on the performance information via a memory-dependency aware model previously trained to learn past interests of the user and intensities of such past interests. An updated user embedding is generated to represent current interests of the user via the adapted user embedding produced by the memory-dependency aware model according to the known intensities of the past interests of the user as well as user's interest exhibited in the recommended content.

20 Claims, 14 Drawing Sheets

Process historical data to create training data 405

Train memory/dependency aware model 415

Receive content embeddings for current content 425

Feed current content embeddings to model 435

Propagate sequentially via memory units 445

Output user embeddings via last memory unit 455

SYSTEM AND METHOD FOR CONTENT RECOMMENDATION VIA SEQUENCE AWARE USER ENCODER

BACKGROUND

1. Technical Field

The present teaching generally relates to electronic content processing. More specifically, the present teaching relates to content recommendation.

2. Technical Background

With the development of the Internet and the ubiquitous network connections, more and more commercial and social activities are conducted online. Networked content is served to millions, some requested and some recommended. Such online content includes information such as publications, articles, communications, as well as advertisements. Online platforms that make electronic content available to users leverage the opportunities to provide content of users' likings to maximize the monetization of the platforms. To offer desirable content to a user, a recommendation may be made by matching the user's interests/preferences in terms of, e.g., topics or categories thereof, with that of the content items considered or in some instances, according to certain trending topics. To capture a user's interests/preferences, in some examples, the user's activities in content consumption may be monitored and analyzed to obtain a representation that characterize the interests/preferences of the user. Similarly, content items may also be analyzed and characterized by a representation indicative of corresponding interests expressed.

This may facilitate a matching between a user's interests and that expressed in content items to identify what may be recommended that may be align with the user's interests. However, users' interests change over time. A content recommendation system needs to adapt to such changes. Efforts have been made to introduce adaptivity in characterizing a user's interests/preferences. For example, in analyzing historic online activities of a user, user online activities from a more recent time frame may be weighed more, while that from a more remote time frame may be weighed less or even phased out in terms of their impact in determining the user's interests/preferences. A conventional approach to implement this time-dependent differential treatment is via a deterministic decay function. FIG. 1 illustrates an exemplary decay function 100. As seen, there are different time instances, including a most recent time instance T0, and then past time instances at T0-1, T0-2, . . . , T0-4, with the allocated weights corresponding to 0.9, 0.7, 0.4, 0.2, and 0.16, respectively. Other fixed or deterministic weights allocation may also be possible.

A decay function such as 100 as illustrated in FIG. 1 may define a weight value at each time instance in such a way that the further a time instance is from the current time instance T0, the lower the weight is. Applying such a decay function to user activity data according to their time stamps may ensure that the older activity data contributes less weight than newer activity data so that a user representation derived as such may adapt to the time-changing interests/preferences. Although the conventional approach addresses the changing interests/preferences using a decay function with respect to time, it does not consider at all the fact that the intensity in any interest may differ from user to user so that using a uniform way to decay the impact of user activity data to a user representation may not be appropriate and make fail to capture the changing interests/preferences of users in an individualized manner.

Thus, there is a need for a solution that can tackle the issue associated with the traditional approaches to enhance the quality of content recommendation.

SUMMARY

The teachings disclosed herein relate to methods, systems, and programming for information management. More particularly, the present teaching relates to methods, systems, and programming related to content processing and categorization.

In one example, a method, implemented on a machine having at least one processor, storage, and a communication platform capable of connecting to a network for content recommendation. Content is selected from multiple pieces of content for recommending to a user based on a user embedding and contextual information. Performance of the user with respect to the recommended content is obtained. The user embedding for the user is adapted based on the performance information via a memory-dependency aware model previously trained to learn past interests of the user and intensities of such past interests. An updated user embedding is generated to represent current interests of the user via the adapted user embedding produced by the memory-dependency aware model according to the known intensities of the past interests of the user as well as user's interest exhibited in the recommended content.

In a different example, a system is disclosed for displaying ads that includes a content recommendation engine, a performance information collector, and a sequence-aware user encoder for perform the following steps. Content is selected from multiple pieces of content for recommending to a user based on a user embedding and contextual information. Performance of the user with respect to the recommended content is obtained. The user embedding for the user is adapted based on the performance information via a memory-dependency aware model previously trained to learn past interests of the user and intensities of such past interests. An updated user embedding is generated to represent current interests of the user via the adapted user embedding produced by the memory-dependency aware model according to the known intensities of the past interests of the user as well as user's interest exhibited in the recommended content.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for content recommendation. When the information is read by the machine, it causes the machine to perform the following steps. Content is selected from multiple pieces of content for recommending to a user based on a user embedding and contextual information. Performance of the user with respect to the recommended content is obtained. The user embedding for the user is adapted based on the performance information via a memory-dependency aware model previously trained to learn past interests of the user and intensities of such past interests. An updated user embedding is generated to represent current interests of the user via the adapted user embedding produced by the memory-dependency aware model according to the known intensities of the past interests of the user as well as user's interest exhibited in the recommended content.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses a framework for content recommendation based on user embeddings generated in a sequence-aware manner with an individualized and adaptive decay scheme that overcomes the shortcomings of the conventional approach. As discussed herein, conventionally a decay function is deterministically defined and applied to all users without regard to the individualized intensity towards different interests that each user exhibited. The present teaching discloses a sequence-aware mechanism for obtaining user embeddings that are memory-dependency sensitive so that the decaying mechanism for each user is individualized and adaptive with respect to the sequence of events associated with the user. In this manner, the user embeddings so derived may more accurately represent each user's interests in terms of intensities as well as the changes exhibited over time. Such user embeddings are individualized to adapt to each user to enable more effective matchings of content that may be in alignment with the user's interests.

Figure 1:
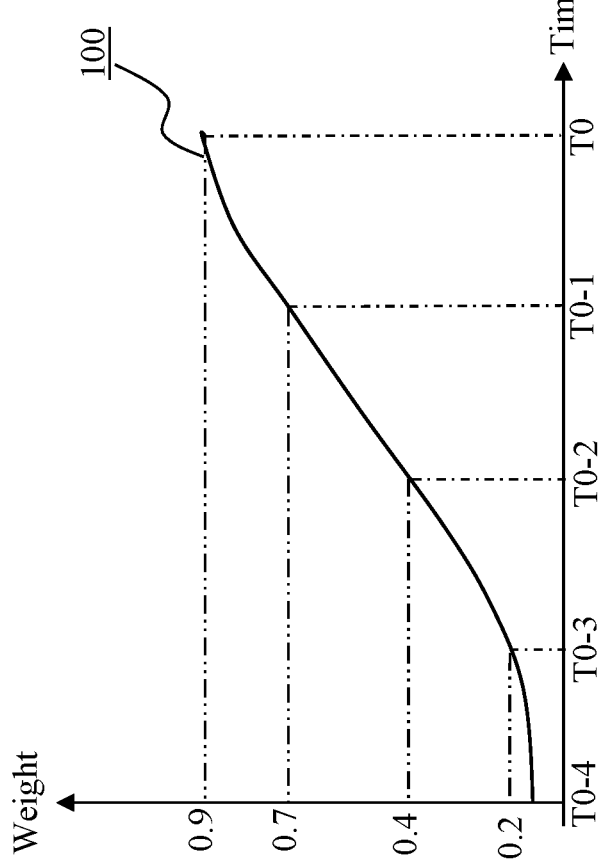
FIG. 1 illustrates an exemplary deterministic decay function.
Figure 2A:
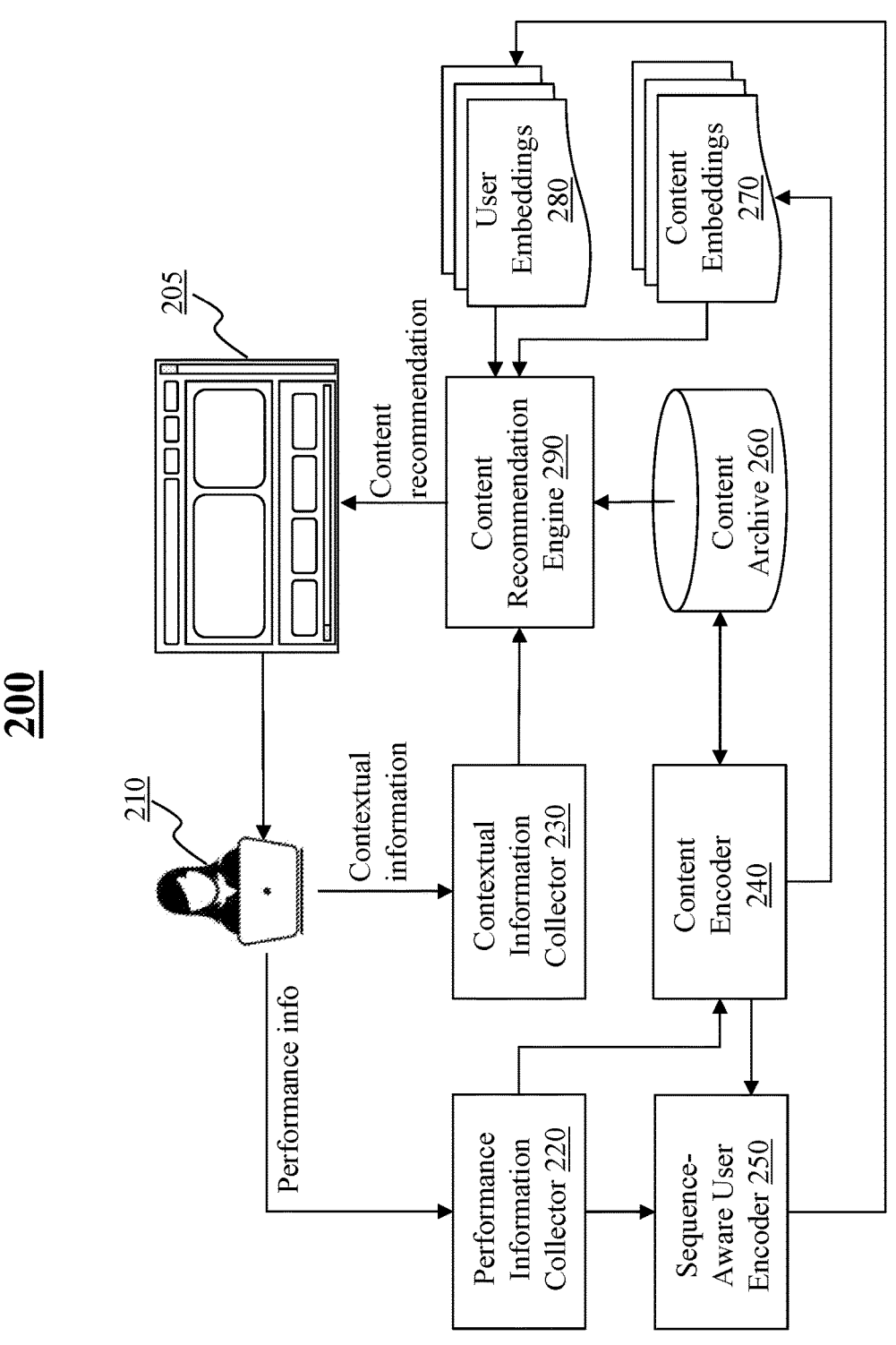
FIG. 2A depicts an exemplary high-level system diagram of a framework for content recommendation using a sequence-aware approach to individualized and adaptive decaying scheme, in accordance with an embodiment of the present teaching.

FIG. 2A depicts an exemplary high-level system diagram of a framework 200 for content recommendation based on user embeddings obtained via a sequence-aware approach to an individualized and adaptive decaying scheme, in accordance with an embodiment of the present teaching. A user 210 may interact with a device 205 that displays content recommended to the user by a content recommendation engine 290. The device may be of any device that may connect to an online platform via Internet or proprietary networks for sending and receiving information from the online platform and may correspond to a computer, a tablet, a personal data assistant (PDA), a mobile phone, a wristwatch, a gaming device, or any applications activated thereon. Through the device 205, the user 210 may provide input to an online platform and/or receive information therefrom such as recommended content.

Figure 3A:
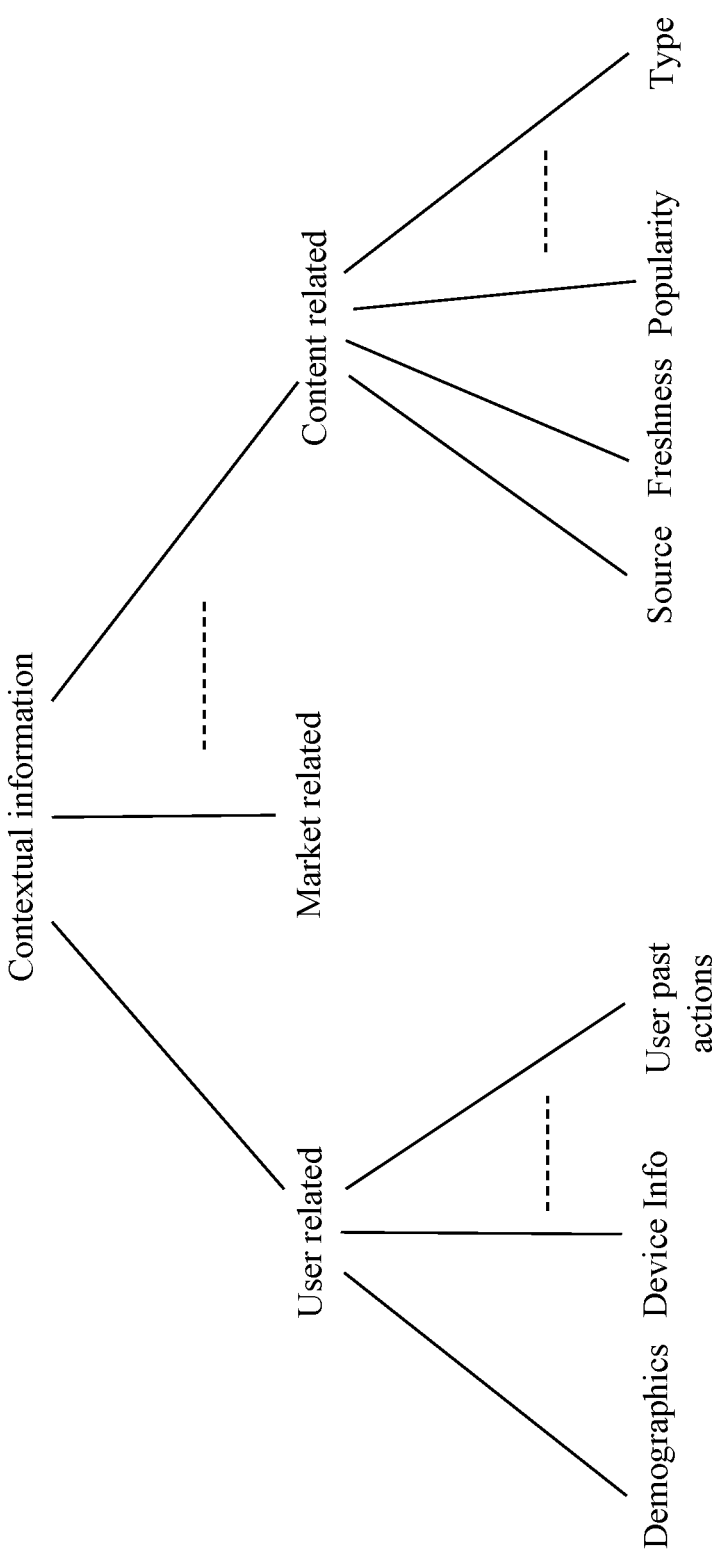
FIG. 3A shows exemplary types of contextual information to be considered in content recommendation via a sequence-aware approach, in accordance with an embodiment of the present teaching.

In the illustrated embodiment, the content recommendation engine 290 may identify content from a content archive 260 to be recommended to a user, where the recommended content may be identified based on information relevant, including, e.g., the user embedding 280 generated by a sequence-aware user encoder 250 for a user 210 to whom the content is to be recommended, content embeddings 270 generated by a content encoder 240 for each of different pieces of content from the content archive 260, as well as contextual information collected by a contextual information collector 230 as relevant to a surrounding associated with the recommendation. FIG. 3A shows exemplary types of contextual information to be considered in content recommendation, in accordance with an embodiment of the present teaching. As illustrated, context information surrounding a recommendation opportunity may include different categories of data, including, without limitation, user related information, market related information, and content related information. User related information may include demographics associated with the user such as the user's gender/age/profession/residence, device related information, . . . , the past user's actions reflective of preferences (e.g., habitual online shopper), etc. Content related information may include a source of the content, content type, content freshness, content popularity, content size/form, etc. Market related information may include market referrer associated with the content, data associated with the market referrer, etc. The contextual information may also include other associated information such as the day of the week, hour of the day, the IP source of the user, etc. that are associated with the recommendation opportunity.

Figure 2B:
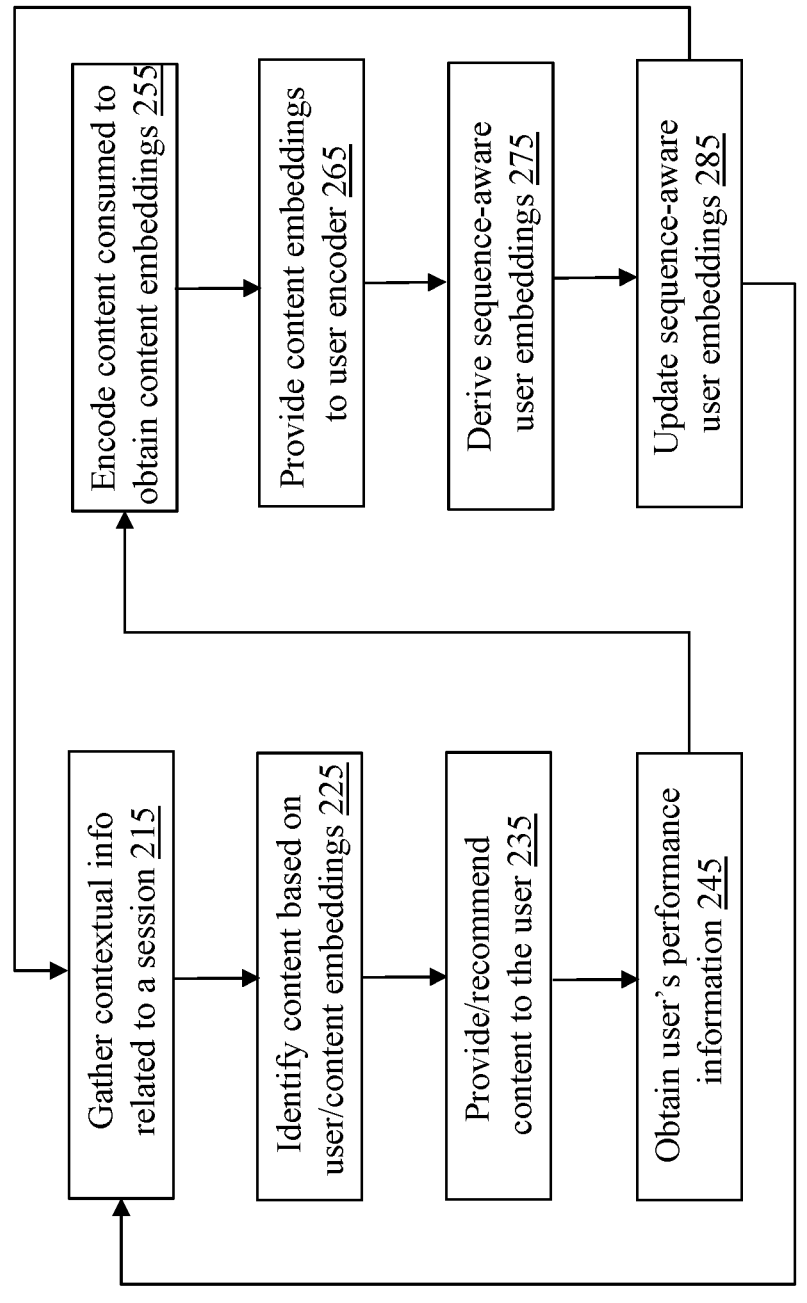
FIG. 2B is a flowchart of an exemplary process for content recommendation via a sequence-aware approach to individualized and adaptive decaying scheme, in accordance with an embodiment of the present teaching.

FIG. 2B is a flowchart of an exemplary process for content recommendation based on user embeddings obtained via a sequence-aware approach to an individualized and adaptive decaying scheme, in accordance with an embodiment of the present teaching. In this illustrated embodiment as seen in FIG. 2A, user embeddings 280 and content embeddings 270 are obtained via learning and archived, respectively, for facilitating content recommendation. Based on users' activities directed to the recommended content, information on performance of different users is monitored and collected by the performance information collector 220. Such performance information forms a sequence of events associated with user's consumption of content and is used, by the sequence-aware user encoder 250 in combination with the embeddings of the content, to adapt the user embeddings 280 over time to dynamically represent the user's changing interests by considering the intensity of the users' interest at different times.

In operation, when the user 210 is interfacing with the device 205 to create a recommendation opportunity, the contextual information collector 230 gather, at 215, information associated with the surrounding context of the session with the user. Such contextual information is provided to the content recommendation engine 290 as part of the information considered in recommending content to the user. Based on the user embeddings associated with the user 210 (that characterize the user's interests/preferences), the content recommendation engine 290 identifies, at 225, content to be recommended to the user 210 by matching the user embedding 280 with content embeddings 270 of different pieces of content and selecting the content piece(s) based on the user embedding, content embeddings, and the contextual information associated with the session. The selected recommended content is then provided, at 235, to the user 210.

The user's activities directed to the recommended content may be monitored and performance related information may be obtained, at 245, by the performance information collector 220. Such monitored information may then be used for adapting the user embeddings 280. In some embodiments, to do so, the recommended content may be encoded at 255 to obtain content embeddings, which are then provided, at 265, to the sequence-aware user encoder 250 to derive, at 275, the adaptive sequence-aware user embeddings. Such user embedding obtained based on the dynamic behavior of the user are then used to update, at 285, the user embedding for the user 210 in the 280 so that the next recommendation of content to the same user is to be made according to the updated user embedding that are sequence-aware and adapted according to the on-going interest changes in terms of both intensity of the interests and the time-dependent behavior.

In content recommendation, a user's interests may be matched against topics/interests exhibited in each piece of content. As discussed herein, a user's interests may be represented via user embeddings generated based on, e.g., content consumed previously and the actions that the user has taken with respect to each piece of content consumed. Each piece of content may be represented as a content embedding representing the topics included in the content. User embeddings and content embeddings may each be structured as a corresponding vector. Such vectors may both be considered in deciding as to how likely the user represented by the user embedding will be interested in the content represented by the content embedding. In some implementations, to make such a decision, the content recommendation engine 290 may be trained to take a user embedding for a user and a content embedding for each piece of content as input and output a decision on the likelihood of the user clicking on the content if recommended. A content piece that is associated with a highest likelihood may be recommended to the user.

In some embodiments, when providing the user embeddings and content embeddings to the content recommendation engine 290, the user embedding may be concatenated with the content embedding as a combined vector. As discussed herein, the content to be recommended may also depend on the contextual information associated with the session. As seen in FIG. 2A, the contextual information gathered from the session may also be provided to the content recommendation engine 290. In some embodiments, the contextual information may also be constructed as a vector with features of different types. Contextual information surrounding a session involving a user may be important because in different situations (e.g., in different spaces and in different times) a user may exhibit different interests. For instance, a user may be interested in tourist information while on vacation, even though this may not be the general interests of the user. Similarly, a user may be interested in home improvement related topics on weekends, contrasting with the interest of the same user on weekdays on other topics. Some of the contextual features may have numerical values (e.g., age, size, hour in a day, etc.) and some may correspond to categorical values (e.g., content type, user's gender, etc.).

Figure 3B:
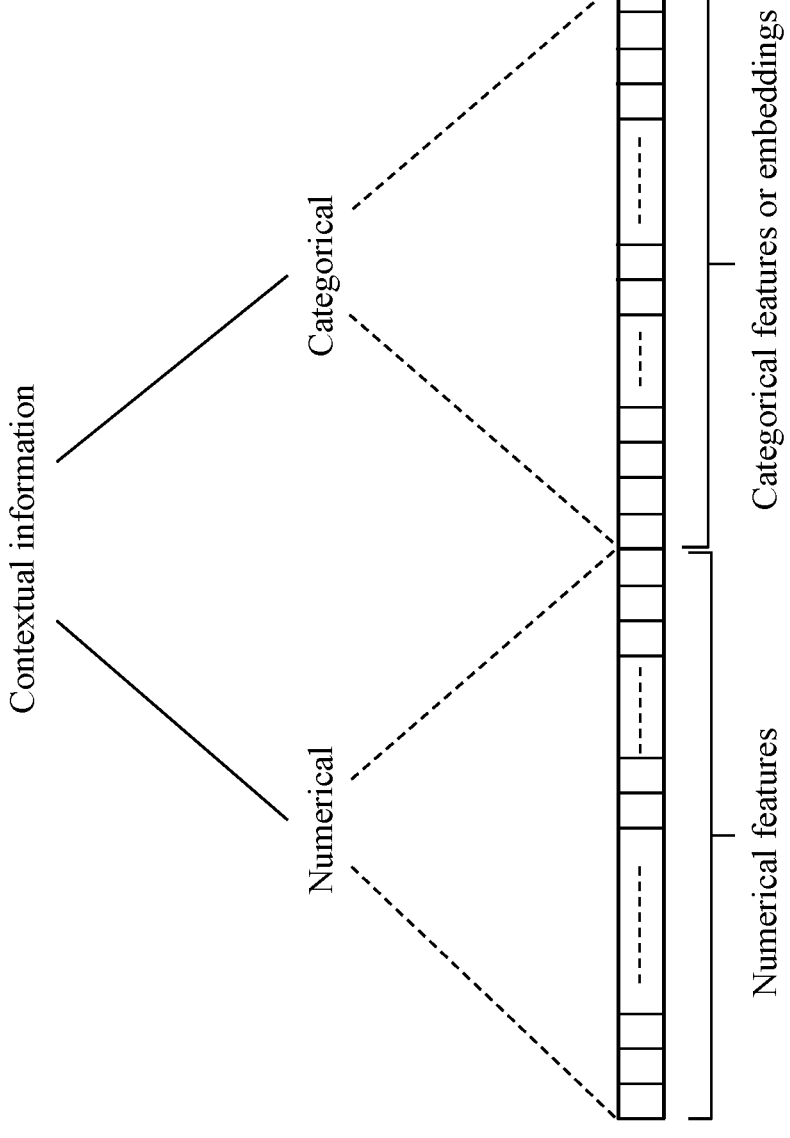
FIG. 3B illustrates exemplary organization of contextual information used in content recommendation, in accordance with an embodiment of the present teaching.
Figure 3C:
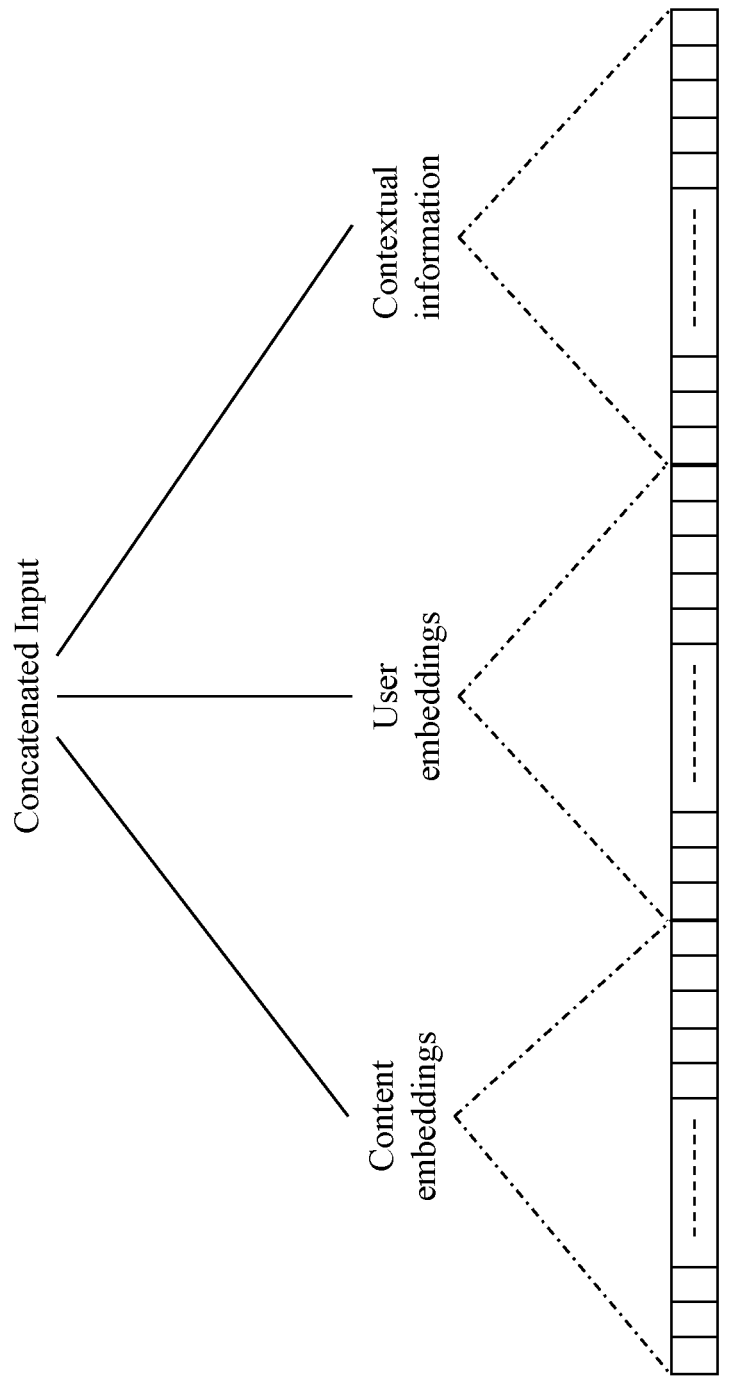
FIG. 3C illustrates an exemplary concatenated input incorporating user embeddings, content embeddings, and contextual information for content recommendation, in accordance with an embodiment of the present teaching.

To consider contextual information in recommending content, contextual information may be organized as, e.g., a feature vector. In some implementations, contextual information may be organized as a group of numerical feature values and a group of categorical feature values, as illustrated in FIG. 3B. In some implementations, some of the contextual features, e.g., categorical features, may also be represented by embeddings learned during training. The representation of contextual information (e.g., a feature vector as shown in FIG. 3B) may also be concatenated with the user embeddings and content embeddings to generate a concatenated input (a feature vector) to be provided to the content recommendation engine 290. This is illustrated in FIG. 3C.

Figure 4A:
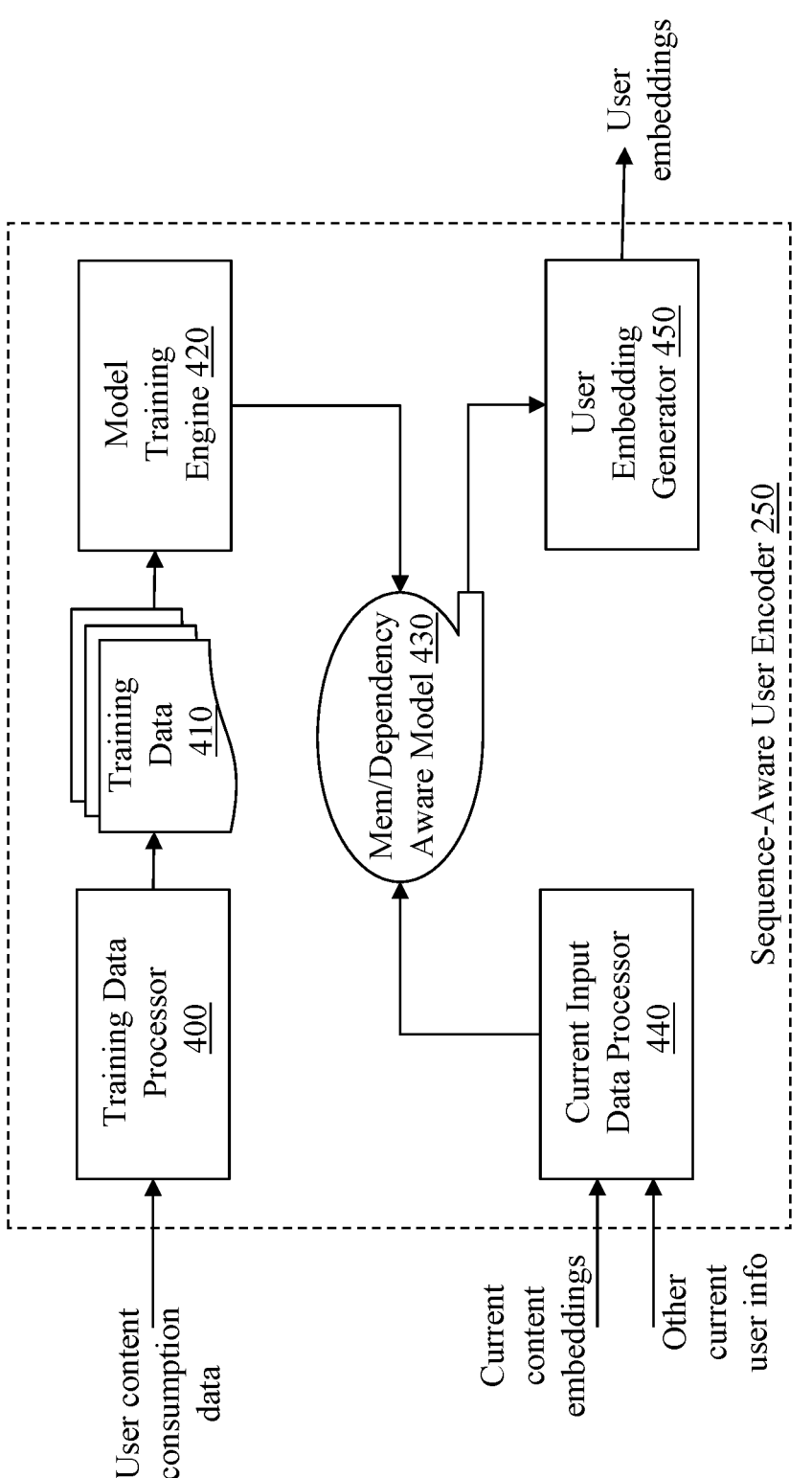
FIG. 4A depicts an exemplary high-level system diagram of a sequence-aware user encoder for obtaining sequence-aware user embeddings, in accordance with an embodiment of the present teaching.

FIG. 4A depicts an exemplary high-level system diagram of the sequence-aware user encoder 250 for obtaining sequence-aware user embeddings, in accordance with an embodiment of the present teaching. In this illustrated embodiment, the sequence-aware user encoder 250 has two parts. The first part is provided for training a memory/dependency aware model 430 that is to be used to generate user embeddings. In this illustrated embodiment, the memory/dependency aware model 430 may be implemented to process time series data to understand not only the dependency relationship in data but also the changes in such relationship over time via techniques capable of having memory on the changing relationships in terms of time.

Figure 4B:
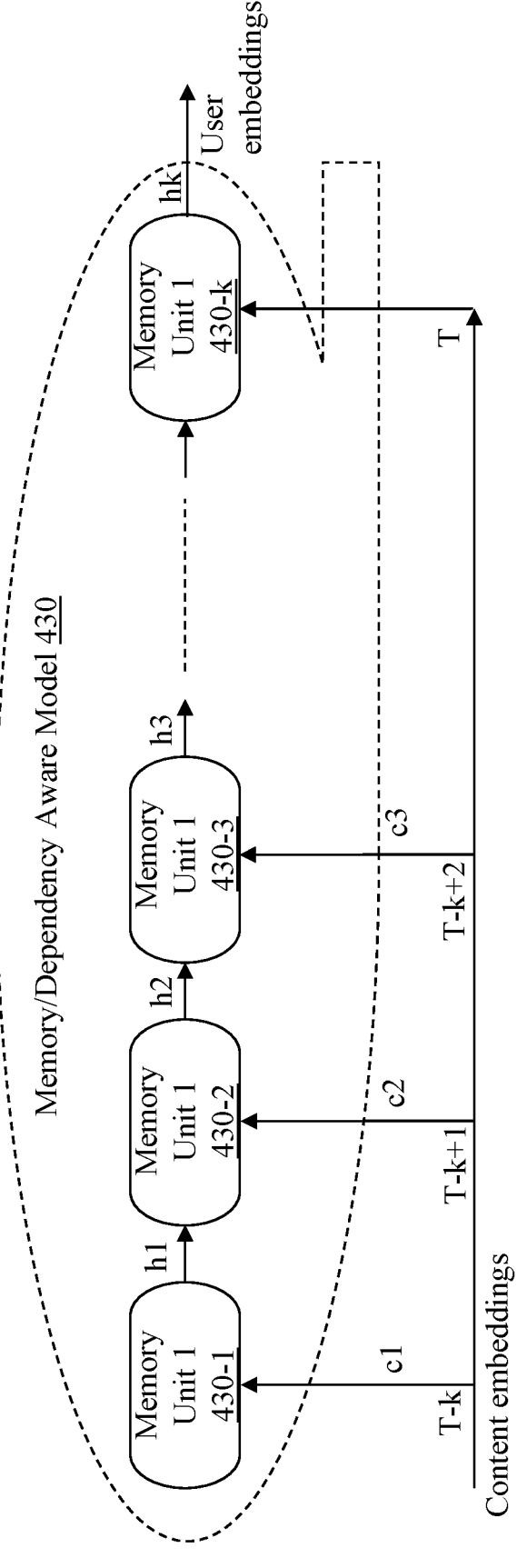
FIG. 4B shows an exemplary memory/dependency aware model for generating user embeddings in a sequence-aware manner to achieve individualized and adaptive decaying scheme in content recommendation, in accordance with an embodiment of the present teaching.

FIG. 4B shows an exemplary construct of the memory/dependency aware model 430 that generates user embeddings for a user based on content embeddings for content pieces that the user consumes in a sequence of times, in accordance with an embodiment of the present teaching. In this exemplary construct, the memory/dependency aware model 430 includes a plurality of memory units 430-1, 430-2, 430-3, . . . , **430-*k***, connected in a series, each of which corresponding to a particular time stamp. When a user clicks on pieces of content over time (e.g., T–k, T–k+1, . . . , T), the content embedding for the piece of content clicked at a particular time instance is provided to a memory unit corresponding to that time instance, along with the previous hidden state from the previous memory unit in the series.

For instance, at time T–k, content embedding c1 (generated based on the content clicked by the user at time T–k) are provided to the memory unit 430-1 at T–k and the memory unit 430-1 generates hidden state information h1 that encodes the interests known up to time T–k. At time T–k+1, when the same user clicks another piece of content, content embedding c2 generated therefor are provided to memory unit 2 430-2 (the next unit in the series). At this point, the input to the memory unit 2 430-2 includes both c2 and h1, i.e., the memory unit 2 430-2 will consider both the user's interests represented by the content clicked at time T–k+1 and the past known interests of the user represented by h1 from the previous memory unit 1 430-1. Similarly, at time T–k+2, c3 corresponding to the content embedding for a piece of content clicked by the user at time T–k+2 is provided to the memory unit 3 430-3 and the hidden state h2 from the previous memory unit 2 430-2 is also input thereto. Thus, the hidden state h3 generated by memory unit 3 430-3 incorporates or has memory of all previously understood interests. If the intensity of the user in certain topics is high so that content pieces in similar topics are clicked, the hidden states produced by different memory units may operate to recognize that and the hidden states so accumulated represents such intensity. The hidden state hk output by the last memory unit k **430-*k*** represents the user embeddings accumulated at the present time.

Figure 4C:
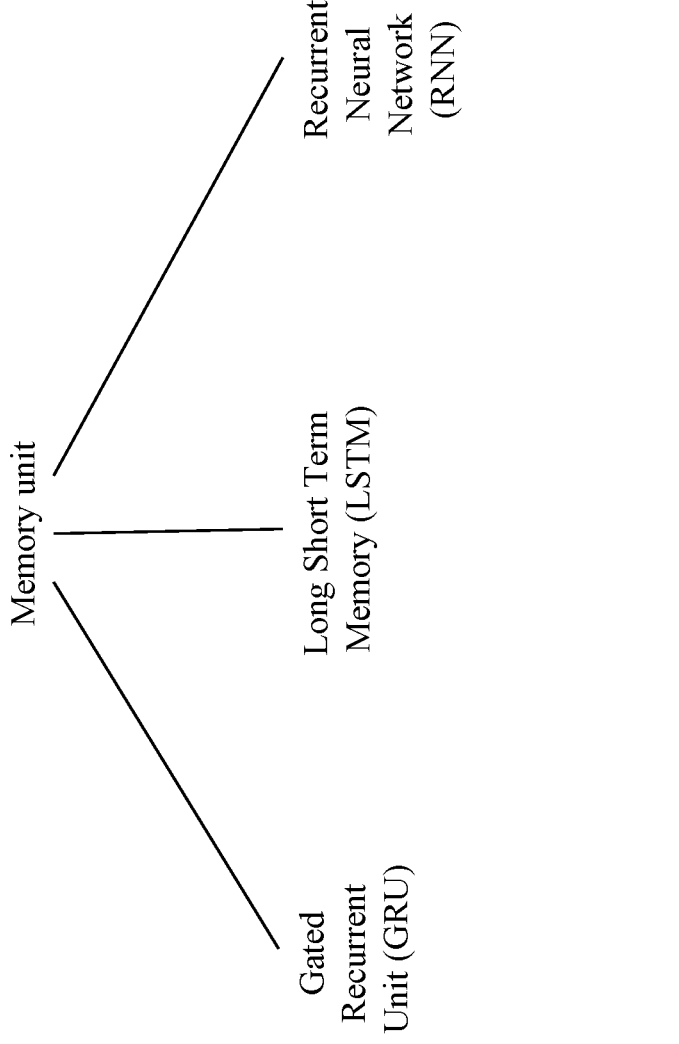
FIG. 4C illustrates exemplary types of artificial neural networks (ANNs) for learning a memory/dependency aware model for deriving user embeddings in a sequence-aware manner, in accordance with some embodiments of the present teaching.

FIG. 4C illustrates exemplary types of artificial neural networks (ANNs) that may be utilized to implement the memory units in the memory/dependency aware model 430, in accordance with some embodiments of the present teaching. As illustrated herein, a memory unit as used in the memory-dependency aware model 430 may be implemented based on, e.g., a gated recurrent unit (GRU), a long short term memory unit (LSTM), . . . , or a recurrent neural network. Referring back to FIG. 4A, the memory-dependency aware model 430 implemented using any of such memory units may be trained initially by the model training engine 420 based on training data 410 that is generated by the training data processor 400 based on historic user content consumption information collected to generate the initial memory-dependency aware model 430.

Once the initial model is obtained, the subsequent content consumption information related to different users, e.g., the content embeddings of the pieces of content clicked by users may be used to continuously provided to the memory-dependency aware model 430 so that the time series information may be utilized to adapt the user embeddings based on the changing interests represented by the content pieces that the users click. This is achieved by the second part of the sequence-aware user encoder 250 by generating user embeddings based on content continually consumed by users. Because the memory/dependency aware model 430 is realized based on memory, through the continually generated content embeddings, such information represents the dynamically changing interests and can be captured by the memory-dependency aware model 430 to generate adaptive user embeddings.

In operation, when content embeddings corresponding to content clicked by a user are provided, the current input data processor 440 processes the input data and provides the content embeddings to an appropriate memory unit in the memory-dependency aware model 430. As discussed herein, the output of the memory/dependency aware model 430 corresponding to the hidden state of the last memory unit and is used by a user embedding generator 450 to produce user embeddings up to that time instant, representing the user's interests/preferences learned accumulatively up to that point. As discussed herein, the user embedding so generated will be provided to the content recommendation engine 290, together with the content embedding for a piece of content to be considered from the content archive 260 (see FIG. 2A) and the contextual information associated with a current session, so that a decision may be made by the content recommendation engine 290 as to the likelihood of the user clicking on the piece of content if recommended.

Figure 4D:
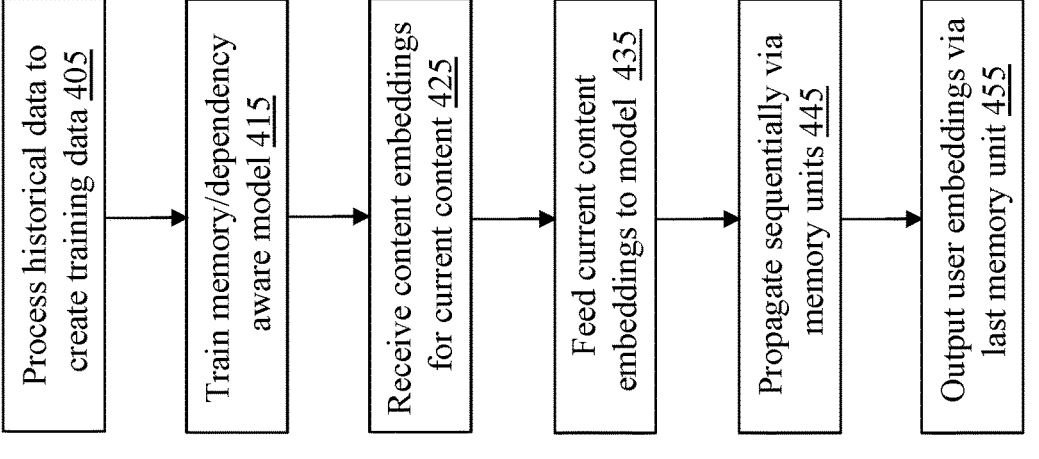
FIG. 4D is a flowchart of an exemplary process of a sequence-aware user encoder for obtaining sequence-aware user embeddings, in accordance with an embodiment of the present teaching.

FIG. 4D is a flowchart of an exemplary process of the sequence-aware user encoder 250 for obtaining sequence-aware user embeddings, in accordance with an embodiment of the present teaching. To train the initial memory-dependency aware model 430, the training data processor 400 receives the historic user content consumption data and processes, at 405, such input data to create training data 410. Based on the generated training data 410, the model training engine 420 trains, at 415, the memory/dependency aware model 430. With the initially trained memory-dependency aware model 430, when the current input data processor 440 receives, at 425, the content embedding for a piece of clicked content associated with a user, it processes the input data and feeds, at 435, the input current content embedding to an appropriate memory unit of the memory/dependency aware model 430. As discussed herein, the memory unit that receives the current content embedding takes the hidden state from a precedent memory unit and the current content embedding and produces an updated hidden state as output which is provided to the next memory unit. The updated hidden state is propagated, at 445, along the sequence and the last memory unit outputs its updated hidden state, which is then used by the user embedding generator 450 to output the updated user embedding at 455.

Figure 5A:
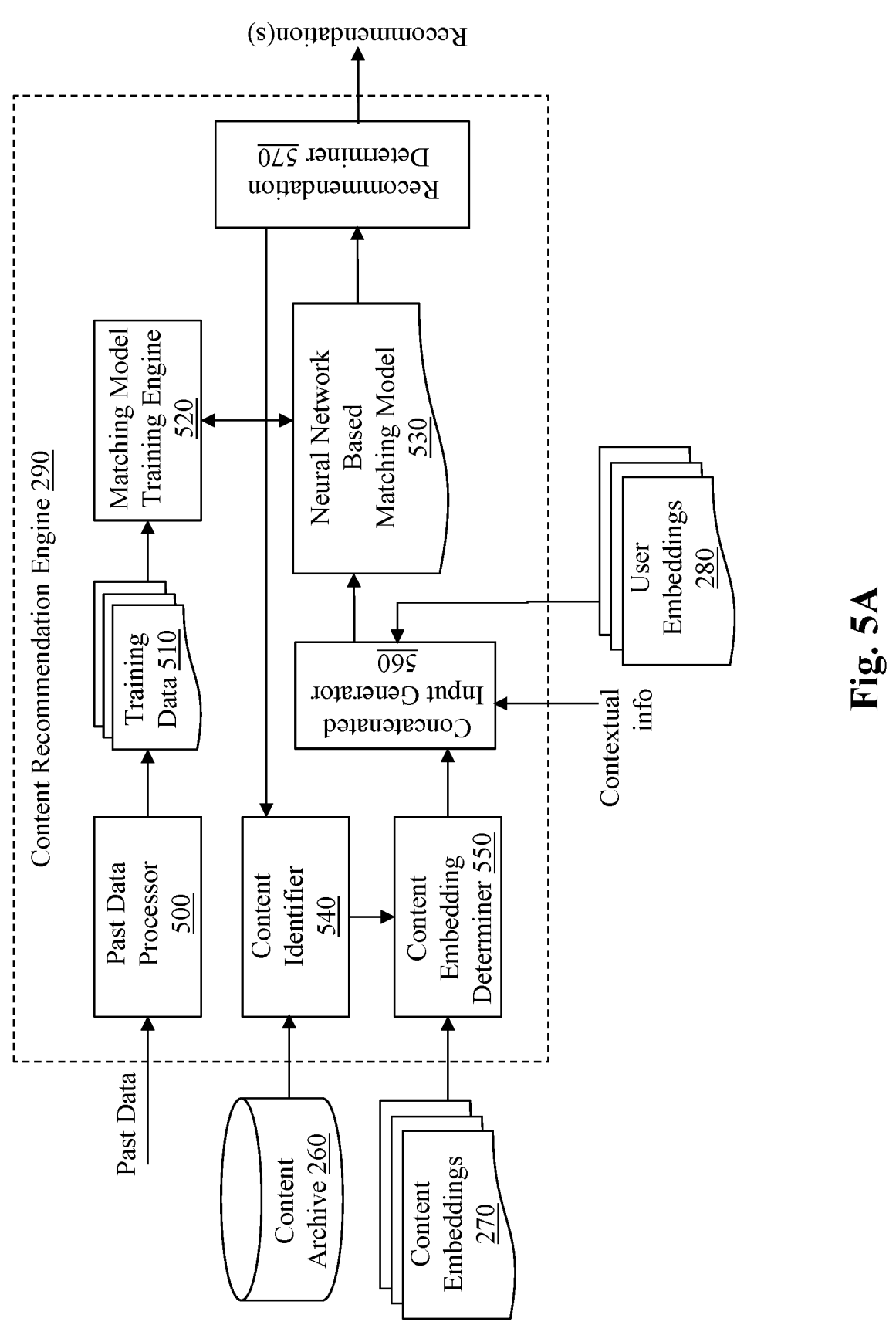
FIG. 5A depicts an exemplary high-level system diagram of a content recommendation engine, in accordance with an embodiment of the present teaching.

FIG. 5A depicts an exemplary high-level system diagram of the content recommendation engine 290, in accordance with an embodiment of the present teaching. In this illustrated embodiment, the content recommendation engine 290 may include two parts. The first part is for training, based on past data, a neural network based (NN-based) matching model 530. The second part is for taking a concatenated input as input (comprising, a user embedding associated with a user in a session, a content embedding for a piece of content considered, and the contextual information related to the session) and producing, via the trained neural network based matching model 530, a decision on the likelihood of the user clicking on the piece of content if it is recommended to the user. The first part comprises a past data processor 500 for creating training data 510 based on received past data and a matching model training engine 520 for training the NN-based matching model 530 using the training data 510. In operation, the past data may include information associated with each pair of user and content piece representing the content that was recommended to a user in a past event with, e.g., associated contextual information and the performance of the event, indicative of whether the user clicked on the recommended content.

To use information in the past data to construct training data 510 for machine learning the NN-based matching model 530, the contextual information associated with each pair of user/content may be extracted, the user embedding may be obtained based on the user involved in the event, and the content embedding may also be obtained based on the piece of content that the user clicked in the event. Such information may be concatenated as a feature vector and then the performance information associated with the recommended content may be used as a label for the event. Based on such data, the matching model training engine 520 may train the NN-based matching model 530 via supervised learning. When the trained NN-based matching model 530 is provided with a feature vector, e.g., with concatenated user embeddings, content embeddings, and contextual information (as illustrated in FIG. 3C), it may determine a likelihood that the given user is to click on the piece of content if it is recommended thereto.

The second part of the content recommendation engine 290 is provided to operate to select, based on information about a user and the contextual information related to an event associated with the user, one or more pieces of content from the content archive 260 based on likelihood metrics generated by the trained neural network based matching model 530 with respect to different pieces of content that may be recommended to the user given the contextual information. In this illustrated embodiment, the second part of the content recommendation engine 290 comprises a content identifier 540, a content embedding determiner 550, a concatenated input generator 560, and a recommendation determiner 570. The content identifier 540 may be provided to identify, one at a time, different pieces of candidate content from the content archive 260 for being considered for recommendation. For each piece of candidate content, the content embedding determiner 550 may be provided to obtain the embedding for the candidate content by, e.g., either generating or retrieving the embedding for the candidate content from previously obtained content embeddings 270.

With the information about the user and the contextual information, the concatenated input generator 560 may be provided for retrieving the embedding for the user from 280 and then generating a concatenated input based on the user embedding, content embedding (from the content embedding determiner 550), and the input contextual information. The concatenated input is then provided to the trained NN-based matching model 530 which produces a metric indicative of the likelihood that the user is going to click on the candidate content if recommended thereto. The metric determined for each piece of content considered may be provided to the recommendation determiner 570, which may control the content identifier 540 to further identify additional candidate content for consideration. The recommendation determiner 570 may then select, based on the likelihood metrics for different pieces of candidate content, one or more pieces as recommended content for the given user.

Figure 5B:
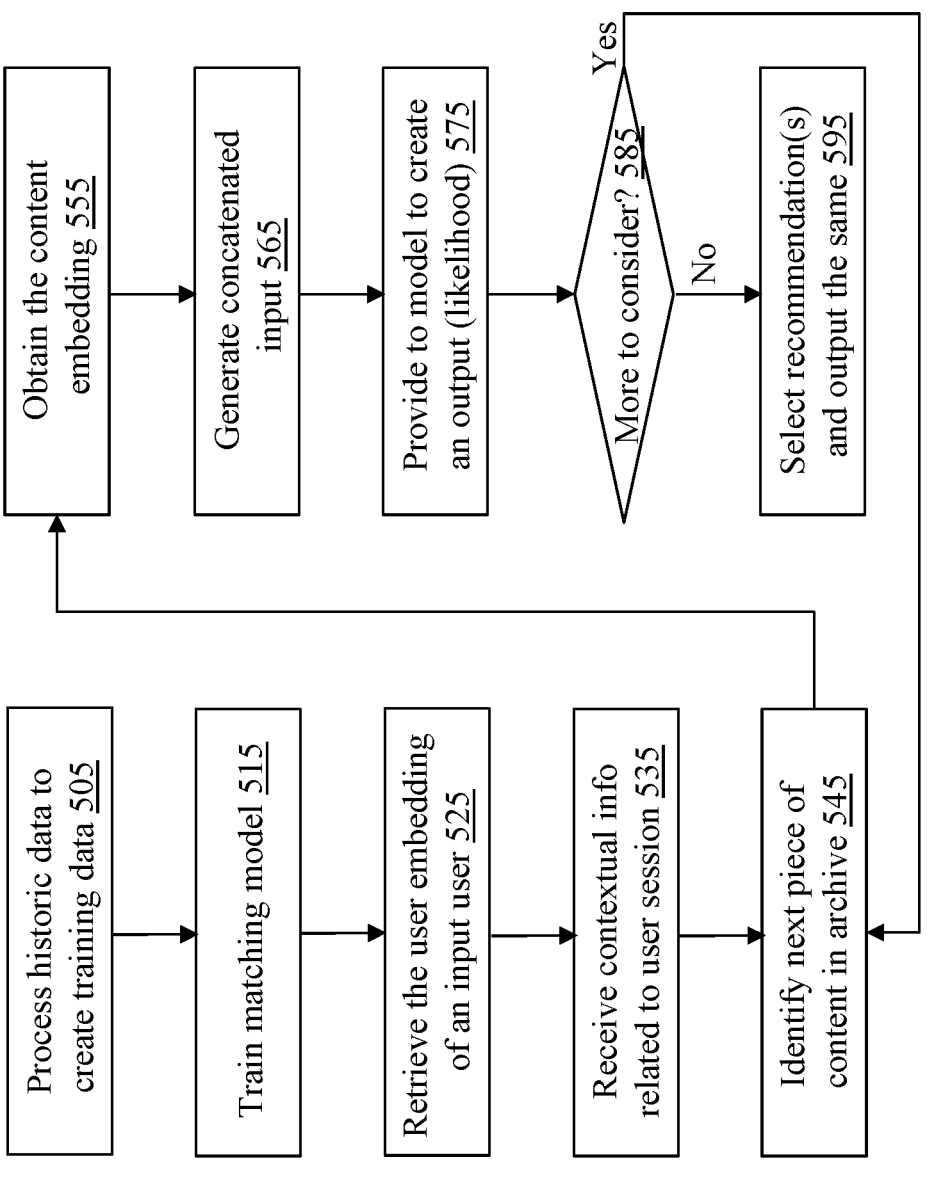
FIG. 5B is a flowchart of a content recommendation engine, in accordance with an embodiment of the present teaching.

FIG. 5B is a flowchart of an exemplary process of the content recommendation engine 290, in accordance with an embodiment of the present teaching. When past data is received, the past data processor 500 processes, at 505, the past data to generate training data 510, which is then used by the matching model training engine 520 to train, at 515, the NN-based matching model 530. With the trained NN-based matching model 530, when input specifying a user involved in a session is received, the concatenated input generator 560 may retrieve, at 525, the previously generated embedding of the user and receives, at 535, the contextual information associated with the session. As discussed herein, the user embedding and the contextual information may be matched, via the NN-based matching model 530, against content embeddings for different pieces of candidate content to derive corresponding metrics indicative of the respective likelihoods for the user to click on each of the candidate content. In some embodiments, this process may be carried out via a process in which each piece of candidate content may be considered one at a time.

As illustrated in FIG. 5B, a piece of candidate content may be identified at 545, which may be used by the content embedding determiner to obtain, at 555, the embedding for the identified candidate content. As discussed herein, if the embedding for the candidate content have been created previously and stored in 270, the previously created content embedding is retrieved. If not, the content embedding determiner 550 may create the embedding for the candidate content. Based on such obtained content embedding for the current candidate content, the concatenated input generator 560 may proceed to generate, at 565, the current concatenated input and provide, at 575, the concatenated input with respect to the current candidate content to the NN-based matching model 530 to generate an output representing the clicking likelihood. If more candidate content is to be considered, determined at 585, the process returns to step 545 to identify the next candidate content for which a corresponding clicking likelihood is to be determined. In some embodiments, the operation may be configured to control the process to select K recommendations based on N candidate content pieces. In this case, the process of generating candidate content pieces with corresponding clicking likelihood may be repeated N times, controlled at 585, before the recommendation determiner 570 proceeds to select, at 595, K recommendations based on N metrics generated therefor.

The K selected recommended content pieces may then be provided to the device 205 for display (see FIG. 2A). The user's reactions to the recommended content pieces may then be monitored and performance data may be collected by the performance information collector 220 so that such feedback information may then be used by the sequence-aware user encoder 250 to update the user embedding in 280 in order to adapt according to the changing interests of the user, as discussed herein. In this manner, the user embedding dynamically track the changes in interests in a manner that is sequence-aware and adapt according to the intensities of different interests exhibited by the user in the user's activities. Using the present teaching as discussed herein, the adaptation of the user embeddings is also individualized without applying a fixed and pre-determined decay function to all users.

Figure 6:
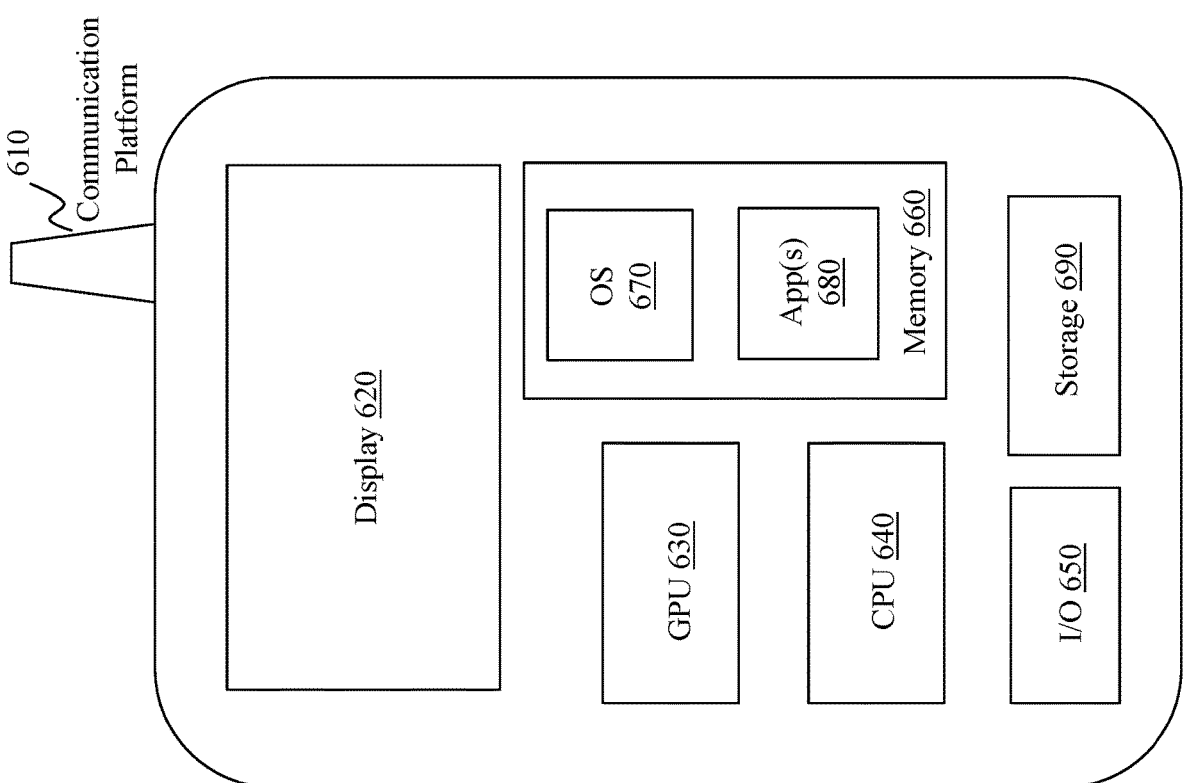
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a user interface or any other suitable mobile apps for information analytics and management according to the present teaching on, at least partially, the mobile device 600. User interactions, if any, may be achieved via the I/O devices 650 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
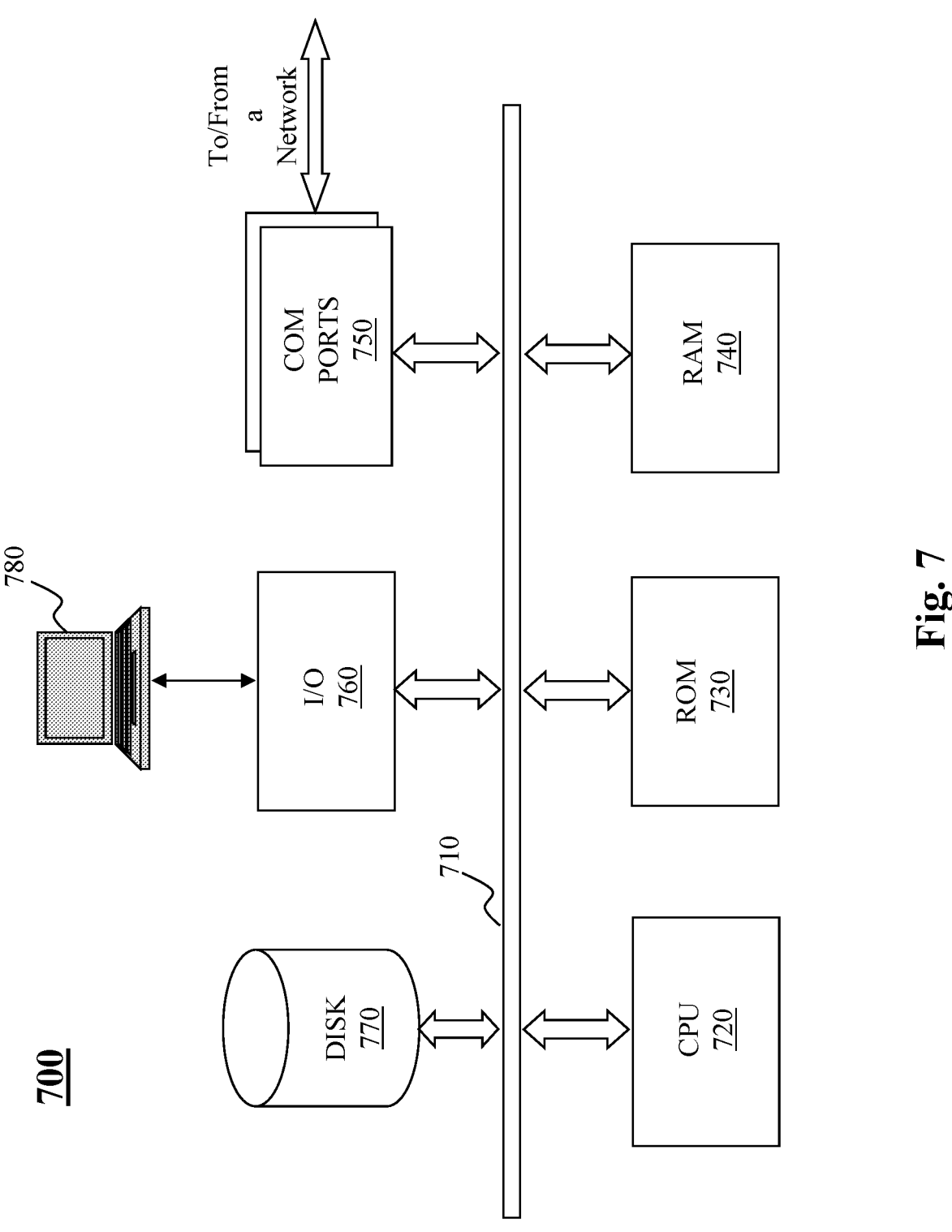
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information analytical and management method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, comprising:

receiving information about a user engaged in an online session and contextual information surrounding the online session;

recommending a piece of content, selected from multiple pieces of content, to the user in the online session, wherein the piece of content is selected based on a user embedding representing interests of the user at that time, the contextual information, and a characterization of each of the multiple pieces of content;

obtaining performance information of the user with respect to the piece of content, wherein the performance information is indicative of the user's interest in the piece of content;

adapting the user embedding based on the performance information via a memory-dependency aware model previously trained to learn past interests of the user with respective intensities thereof accumulated over time based on performance information related to content in similar topics; and generating an updated user embedding to represent current interests of the user via the adapted user embedding produced by the memory-dependency aware model according to the known intensities of the past interests of the user as well as user's interest exhibited in the piece of content.

2. The method of claim 1, wherein the contextual information comprises:

user related information including at least one of demographic data and past actions of the user;

content related information including at least one of a source, a type, freshness, and popularity of the piece of content; and market related information.

3. The method of claim 1, wherein the performance information comprises at least one of:

a click by the user on the piece of content;

a conversion based on the piece of content; and a characterization of engagement of the user with the piece of content.

4. The method of claim 1, wherein the step of adapting the user embedding comprises:

retrieving content embeddings corresponding to the characterization of the piece of content;

providing the content embeddings to the memory-dependency aware model to incorporate the user's interest in the piece of content with the past interests and intensity thereof learned previously by the memory-dependency aware model; and receiving an output from the memory-dependency aware model representing the adapted user embedding.

5. The method of claim 1, wherein the memory-dependency aware model includes serially connected memory units representing a time series, wherein each of the memory units corresponds to a time instant and learns the user's interests and intensities thereof at that time instant based on content embeddings representing content the user is interested at the time instant and an output of a serially connected preceding memory unit representing the past interests and intensities thereof learned prior to the time instant.

6. The method of claim 5, wherein each of the serially connected memory units corresponds to at least one of a gated recurrent unit (GRU), a long short term memory (LSTM) unit, and a recurrent neural network (RNN).

7. The method of claim 5, wherein the step of recommending the piece of content comprises:

determining one of the memory units corresponding to a time instant appropriate for the online session;

for each instant piece of the multiple pieces of content, integrating the user embedding, the contextual information, and the characterization of the instant piece of content to generating an integrated input, providing the integrated input to a matching model previously trained, receiving, from the matching model, a metric associated with the instant piece of content representing a likelihood of the user having an interest in the instant piece of content given the contextual information; and selecting the piece of content from the multiple pieces of content to be recommended to the user based on the metrics for corresponding multiple pieces of content.

8. A machine readable and non-transitory medium having information recorded thereon, wherein the information, when read by the machine, causes the machine to perform the following steps:

receiving information about a user engaged in an online session and contextual information surrounding the online session;

recommending a piece of content, selected from multiple pieces of content, to the user in the online session, wherein the piece of content is selected based on a user embedding representing interests of the user at that time, the contextual information, and a characterization of each of the multiple pieces of content;

obtaining performance information of the user with respect to the piece of content, wherein the performance information is indicative of the user's interest in the piece of content;

adapting the user embedding based on the performance information via a memory-dependency aware model previously trained to learn past interests of the user with respective intensities thereof accumulated over time based on performance information related to content in similar topics; and generating an updated user embedding to represent current interests of the user via the adapted user embedding produced by the memory-dependency aware model according to the known intensities of the past interests of the user as well as user's interest exhibited in the piece of content.

9. The medium of claim 8, wherein the contextual information comprises:

user related information including at least one of demographic data and past actions of the user;

content related information including at least one of a source, a type, freshness, and popularity of the piece of content; and market related information.

10. The medium of claim 8, wherein the performance information comprises at least one of:

a click by the user on the piece of content;

a conversion based on the piece of content; and a characterization of engagement of the user with the piece of content.

11. The medium of claim 8, wherein the step of adapting the user embedding comprises:

retrieving content embeddings corresponding to the characterization of the piece of content;

providing the content embeddings to the memory-dependency aware model to incorporate the user's interest in the piece of content with the past interests and intensity thereof learned previously by the memory-dependency aware model; and receiving an output from the memory-dependency aware model representing the adapted user embedding.

12. The medium of claim 8, wherein the memory-dependency aware model includes serially connected memory units representing a time series, wherein each of the memory units corresponds to a time instant and learns the user's interests and intensities thereof at that time instant based on content embeddings representing content the user is interested at the time instant and an output of a serially connected preceding memory unit representing the past interests and intensities thereof learned prior to the time instant.

13. The medium of claim 12, wherein each of the serially connected memory units corresponds to at least one of a gated recurrent unit (GRU), a long short term memory (LSTM) unit, and a recurrent neural network (RNN).

14. The medium of claim 12, wherein the step of recommending the piece of content comprises:

determining one of the memory units corresponding to a time instant appropriate for the online session;

for each instant piece of the multiple pieces of content, integrating the user embedding, the contextual information, and the characterization of the instant piece of content to generating an integrated input, providing the integrated input to a matching model previously trained, receiving, from the matching model, a metric associated with the instant piece of content representing a likelihood of the user having an interest in the instant piece of content given the contextual information; and selecting the piece of content from the multiple pieces of content to be recommended to the user based on the metrics for corresponding multiple pieces of content.

15. A system, comprising:

a content recommendation engine implemented by a processor and configured for receiving information about a user engaged in an online session and contextual information surrounding the online session, and recommending a piece of content, selected from multiple pieces of content, to the user in the online session, wherein the piece of content is selected based on a user embedding representing interests of the user at that time, the contextual information, and a characterization of each of the multiple pieces of content;

a performance information collector implemented by a processor and configured for obtaining performance information of the user with respect to the piece of content, wherein the performance information is indicative of the user's interest in the piece of content; and a sequence-aware user encoder implemented by a processor and configured for adapting the user embedding based on the performance information via a memory-dependency aware model previously trained to learn past interests of the user with respective intensities thereof accumulated over time based on performance information related to content in similar topics, and generating an updated user embedding to represent current interests of the user via the adapted user embedding produced by the memory-dependency aware model according to the known intensities of the past interests of the user as well as user's interest exhibited in the piece of content.

16. The system of claim 15, wherein the contextual information comprises:

user related information including at least one of demographic data and past actions of the user, content related information including at least one of a source, a type, freshness, and popularity of the piece of content, and market related information; and the performance information comprises at least one of:

a click by the user on the piece of content, a conversion based on the piece of content, and a characterization of engagement of the user with the piece of content.

17. The system of claim 15, wherein the step of adapting the user embedding comprises:

retrieving content embeddings corresponding to the characterization of the piece of content;

providing the content embeddings to the memory-dependency aware model to incorporate the user's interest in the piece of content with the past interests and intensity thereof learned previously by the memory-dependency aware model; and receiving an output from the memory-dependency aware model representing the adapted user embedding.

18. The system of claim 15, wherein the memory-dependency aware model includes serially connected memory units representing a time series, wherein each of the memory units corresponds to a time instant and learns the user's interests and intensities thereof at that time instant based on the content embeddings representing content the user is interested at the time instant and an output of a serially connected preceding memory unit representing the past interests and intensities thereof learned prior to the time instant.

19. The system of claim 18, wherein each of the serially connected memory units corresponds to at least one of a gated recurrent unit (GRU), a long short term memory (LSTM) unit, and a recurrent neural network (RNN).

20. The system of claim 18, wherein the step of recommending the piece of content comprises:

determining one of the memory units corresponding to a time instant appropriate for the online session;

for each instant piece of the multiple pieces of content, integrating the user embedding, the contextual information, and the characterization of the instant piece of content to generating an integrated input, providing the integrated input to a matching model previously trained, receiving, from the matching model, a metric associated with the instant piece of content representing a likelihood of the user having an interest in the instant piece of content given the contextual information; and selecting the piece of content from the multiple pieces of content to be recommended to the user based on the metrics for corresponding multiple pieces of content.

* * * * *